No. 687,219. Patented Nov. 26, 1901.
T. T. GAFF.
TREATMENT OF MAIZE OR INDIAN CORN FOR OBTAINING CORN MILLING PRODUCTS.
(Application filed Mar. 7, 1901.)
(No Model.)
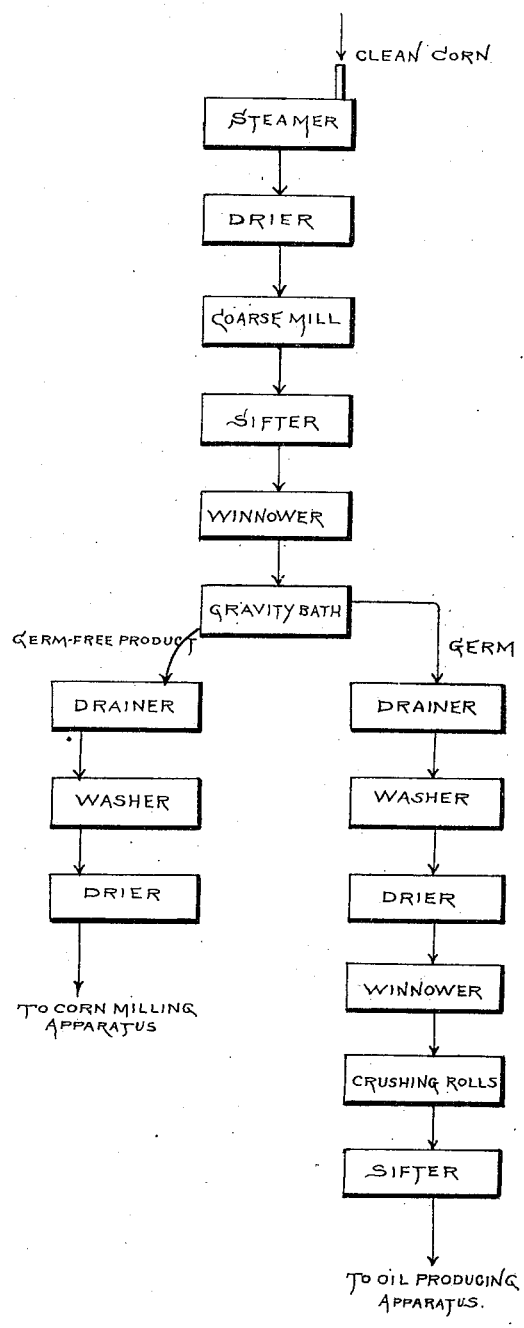

UNITED STATES PATENT OFFICE.

THOMAS T. GAFF, OF BARNSTABLE, MASSACHUSETTS.

TREATMENT OF MAIZE OR INDIAN CORN FOR OBTAINING CORN-MILLING PRODUCTS.

SPECIFICATION forming part of Letters Patent No. 687,219, dated November 26, 1901.

Application filed March 7, 1901. Serial No. 50,447. (No specimens.)

*To all whom it may concern:*

Be it known that I, THOMAS T. GAFF, a citizen of the United States, and a resident of Barnstable, in the county of Barnstable and State of Massachusetts, have invented a new and useful Improvement in the Treatment of Maize or Indian Corn for Obtaining Corn-Milling Products, of which the following is a specification.

My invention is directed to obtaining the products of corn-milling, by which I intend not only such products—hominy, grits, flakes, and meal—but also what may be termed "by-products," such as the germs.

It is my object to effect a thorough separation of the germs from the starch-bearing portions of the grain, so as to obtain, on the one hand, germ-free starch-bearing products and, on the other hand, a concentrated germ product and at the same time to reduce the labor and expense of manufacture.

The process of manufacture which I employ is essentially one of dry grinding, save that at one stage of the process I employ a gravity-bath for the purpose of separating the coarsely-broken bits of grain from the germs, and even then both the material thus freed from germs and the germs themselves are dried before further treatment.

The process which I have devised and which I will proceed to describe comprises the essential steps of moistening the grain, not sufficiently to destroy the structural adhesion of the starch-cells and glutinous principle of the grain, but to the extent only of toughening it to decrease its brittleness and promote easier hulling, then coarsely breaking the thus-moistened grain, then subjecting the same to the action of a gravity-bath, wherein and whereby the germs are separated from the heavier starch-bearing bits of grain, and then drying this germ-free product and manufacturing the same into hominy, grits, flakes, meal, and other products by the methods usually employed in corn-milling, the germs also being dried and then separated from the material which may have passed off with them from the gravity-bath.

To enable those skilled in the art of corn-milling to understand and practice my invention, I will now proceed to describe more particularly and in detail the manner in which the same is or may be carried into effect, reference being had to the accompanying diagram, which, however, is designed merely to illustrate in sequence the principle steps of the process without attempting to show in any sense the mechanical details of the various apparatuses employed or the arrangement of the plant containing such apparatuses.

To preliminarily steep the grain to the extent usually practiced in the manufacture of maize or corn starch would result in such disintegration of the starchy portions of the grain as to set free the individual cells of starch, separating them from each other and from the glutinous principle by which they are bound together, thus rendering the starchy portions of the grain unfit for use in the making of the ordinary products of corn-milling; but the preliminary moistening to which I subject the grain is sufficient only to toughen it, so as to facilitate the hulling, and by decreasing its brittleness to hinder and largely prevent the fine comminution and disintegration of the grain which otherwise would take place in the coarse breaking or crushing operation which follows. This moistening is accomplished preferably by passing the grain through a cylinder or cylinders provided with conveyer wings or flights and subjecting it therein to the action of steam and water, care being taken to moisten and toughen the grain only without damage to the glutinous principle. After treatment with water the grain is subjected to such degree of drying as will remove all adhering water and bring it into a damp or moist but not wet condition. Such drying may be conveniently accomplished by passing the wet grain through a series of conveyers, which by turning the grain over and over enable the air to take up and carry off any superfluous moisture. The moistened grain is then coarsely crushed or broken, whereby the hulls or skins are rubbed off and the germs detached, while the toughened starchy body of the grain is broken or comminuted as little as possible. Some fine flour will inevitably result from this crushing process, but the percentage of such product is not large and can be readily separated from the grist by sifting. The grist thus produced is now preferably subjected to a sifting and winnowing process, the winnowing being to remove the hulls or skins and the sifting being to remove fragments or bits of germ-free grain of larger size than the germ. By thus removing the hulls of the grain by winnowing and the larger germ-free starchy bits by sifting, the bulk of the grist is reduced and the further separation facilitated. The hulls are carried off to the feed-bins and the larger germ-free starchy portions applied to the ordinary purposes of manufacture. The remainder left after such winnowing and sifting, or the whole mass if such winnowing and sifting are omitted, is now brought into a bath of any suitable liquid which shall have a density sufficient to cause the germs to float while the heavier starchy bits (and hulls if these have not been removed by winnowing) sink. For this purpose I have found a saturated solution of common salt suitable. Should any other medium be selected, it must be such as shall not so injuriously affect the glutinous principle of the starchy portions of the grain as to cause their disintegration into their component individual starch-cells. Upon introduction into such a bath of brine the germs will float and should be immediately skimmed or floated off the top of the bath. The heavier starchy portions will at once sink and they, too, should be immediately removed from the bottom of the bath, care being taken to adopt for this purpose such device as shall not bring the now separated germs and starchy portions again into admixture. The germ-free product after removal from the bottom of the bath is carried through a chute or conveyer provided with a perforated bottom to permit the draining off of any adhering brine, and it is then preferably carried through another conveyer, in which it is washed with fresh water. After such washing it is then brought into a drier and dried to such degree as shall fit it for subsequent treatment, consisting of the ordinary operations of manufacture into grits, flakes, meal, &c., and the degree of dryness necessary to this end is well known to any one practiced in the art of corn-milling. The germs should likewise be drained of their brine, preferably washed, and dried.

In the case of the germs it will be found that a certain small number of the lighter particles of the starchy portion of the grain and certain particles thereof adhering to the germ and also some certain bits or particles of the hulls of the grain have been carried along and floated over with the germ in the separating-bath. It is desirable to free the germ from these so far as possible, and this can be accomplished after drying in the case of the particles of hull by winnowing and in the case of the starchy particles by passing the germs with which they are mixed through rolls. These small starchy particles being now more brittle than the germ and being already of small size are by this rolling so minutely broken (while the tougher germ is but little more than flattened out) that they may in very great part be bolted out from the germ. Some small portion of the germ will pass out with these finely-comminuted starchy portions; but while this loss of germ occurs and while the starchy portions thus recovered are therefore not fit for use where an oil-free product is desired these disadvantages are outbalanced by the concentration of the germ thereby attained and by the suitableness of such concentrated germ for oil production.

I desire to state, in conclusion, that in using the words "starchy portions" in this specification I am to be understood as meaning not starch-cells nor pure starch, but those portions of the grain of which starch is the chief constituent, but containing also, as in the original grain, the other glutinous and fibrous principles—that is to say, those portions or bits of the grain which are not hulls nor germs.

Having described my invention and the best way now known to me of carrying the same into effect, what I claim herein as new, and desire to secure by Letters Patent, is—

1. The improvement herein described in the treatment of maize or Indian corn for the production of hominy, flakes, grits, and other products of corn-milling the same consisting in preliminarily moistening the grain to such an extent only as to toughen it and promote easier hulling without destroying the structural adhesion of the starch-cells and glutinous principle of the grain; then coarsely breaking or crushing the thus-moistened grain; then subjecting the thus-broken grain to the action of a bath of a liquid of suitable density for the purpose of separating the germs and lighter bodies from the heavier and starchy portions, floating off the germs from the top of the bath, and drawing off the heavier and starchy portions from the bottom of the bath, then drying the germ-free starchy portions, and manufacturing the same into hominy, grits, meal or other products of corn-milling, substantially as and for the purposes hereinbefore set forth.

2. In the treatment of maize or Indian corn for the obtaining of corn-milling products therefrom, the method herein described of separating the germ from the starch-bearing portions of the grain consisting in preliminarily moistening the grain to such an extent only as to toughen it and promote easier hulling without destroying the structural adhesion of the starch-cells and glutinous principle of the grain; then coarsely breaking or crushing the thus-moistened grain; then subjecting the thus-broken grain to the action of a bath of a liquid of suitable density for the purpose of separating the germs and lighter bodies from the heavier and starchy portions, floating off the germs from the top of the bath; then drying the germs and other material which still may remain with the germs; and finally separating the other material from the germs, substantially in the manner hereinbefore set forth.

In testimony whereof I have hereunto set my hand this 7th day of March, 1901.

THOMAS T. GAFF.

Witnesses:
   EDWIN KING LUNDY,
   GEO. W. REA.